(12) United States Patent
Zhou et al.

(10) Patent No.: US 6,178,522 B1
(45) Date of Patent: *Jan. 23, 2001

(54) METHOD AND APPARATUS FOR MANAGING REDUNDANT COMPUTER-BASED SYSTEMS FOR FAULT TOLERANT COMPUTING

(75) Inventors: Jeffrey Xiaofeng Zhou, Ellicott City; Thomas Gilbert Roden, III, New Windsor; Louis P. Bolduc, Columbia; Dar-Tzen Peng, Columbia; James W. Ernst, Columbia; Mohamed Younis, Columbia, all of MD (US)

(73) Assignee: AlliedSignal Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/140,174

(22) Filed: Aug. 25, 1998

Related U.S. Application Data

(60) Provisional application No. 60/087,733, filed on Jun. 2, 1998.

(51) Int. Cl.$^7$ .......................... H02H 3/05; H03K 19/003
(52) U.S. Cl. ................................. 714/12; 714/11
(58) Field of Search ................. 714/12, 10, 11, 714/4, 7, 797, 798

(56) References Cited

U.S. PATENT DOCUMENTS

| | | | |
|---|---|---|---|
| 4,503,535 | 3/1985 | Budde et al. | 371/11 |
| 4,575,842 | 3/1986 | Katz et al. | 370/16 |
| 4,583,224 | 4/1986 | Ishii et al. | 371/36 |
| 4,634,110 | 1/1987 | Julich et al. | 371/11 |
| 4,817,091 | 3/1989 | Katzman et al. | 371/9 |
| 4,847,837 | 7/1989 | Morales et al. | 371/8 |
| 4,907,232 | 3/1990 | Harper | 371/36 |
| 4,914,657 | 4/1990 | Walter et al. | 371/11.3 |
| 4,933,838 | 6/1990 | Elrod | 364/200 |
| 5,068,499 | 11/1991 | Mutone | 364/200 |
| 5,173,689 | 12/1992 | Kusano | 340/827 |
| 5,261,085 | 11/1993 | Lamport | 395/575 |
| 5,271,014 | 12/1993 | Bruck et al. | 371/11.1 |
| 5,280,607 | 1/1994 | Bruck et al. | 395/575 |
| 5,325,518 | 6/1994 | Bianchini, Jr. | 395/575 |
| 5,349,654 | 9/1994 | Bond et al. | 395/575 |

(List continued on next page.)

OTHER PUBLICATIONS

J. Zhou, "Design Capture for System Dependability," Proc. Complex Systems Engineering Synthesis and Assessment Workshop, NSWC, Silver Spring, MD, Jul. 1992, pp 107–119.

P. Thambidurai, A.M. Finn, R.M. Kieckhafer, and C.J. Walter, "Clock Synchronization in MAFT," Proc. IEEE 19$^{th}$ International Symposium on Fault–Tolerant Computing, 1989, pp 142–149.

* cited by examiner

Primary Examiner—Dieu-Minh T. Le
(74) Attorney, Agent, or Firm—Loria B. Yeadon

(57) ABSTRACT

A stand alone Redundancy Management System (RMS) provides a cost-effective solution for managing redundant computer-based systems in order to achieve ultra-high system reliability, safety, fault tolerance, and mission success rate. The RMS includes a Cross Channel Data Link (CCDL) module and a Fault Tolerant Executive (FE) module. The CCDL module provides data communication for all channels, while the FTE module performs system functions such as synchronization, data voting, fault and error detection, isolation and recovery. System fault tolerance is achieved by detecting and masking erroneous data through data voting, and system integrity is ensured by a dynamically reconfigurable architecture that is capable of excluding faulty nodes from the system and re-admitting healthy nodes back into the system.

9 Claims, 11 Drawing Sheets

U.S. PATENT DOCUMENTS

| | | | |
|---|---|---|---|
| 5,450,578 | 9/1995 | Mackenthum | 395/182.02 |
| 5,463,615 | 10/1995 | Steinhorn | 370/16 |
| 5,473,771 | 12/1995 | Burd et al. | 395/182.02 |
| 5,513,313 | 4/1996 | Bruck et al. | 395/182.02 |
| 5,533,188 * | 7/1996 | Palumbo | 395/182.02 |
| 5,561,759 | 10/1996 | Chen | 395/182.02 |
| 5,684,807 | 11/1997 | Bianchini, Jr. et al. | 371/20.1 |
| 5,689,632 | 11/1997 | Galy et al. | 395/182.09 |
| 5,736,933 | 4/1998 | Segal | 340/825.44 |
| 5,764,882 | 6/1998 | Shingo | 395/182.09 |
| 5,790,397 | 8/1998 | Bissett et al. | 364/131 |

Header

| MT | NID | Message Count |
|----|-----|---------------|

Message Type 0: Data Message

| MT | NID | Message Count | Reserved (16) |
|----|-----|---------------|---------------|
| Data ID ||||
| Data Value ||||
| Data ID ||||
| Data Value ||||
| ⋮ ||||
| Data ID ||||
| Data Value ||||

Message Type 1: System State Message

| MT | NID | Message Count | Fn. Bits | Reserved (12) ||
|----|-----|---------------|----------|---------------|---|
| ISW || NSS | CSS | Res. (8) ||
| Period Counter |||||||

Message Type 2: Cold Start Message

| MT | NID | Message Count | Fn. Bits | Res. (4) | ISW |
|----|-----|---------------|----------|----------|-----|
| ISW0 | ISW1 || ISW2 || ISW3 |
| ISW4 | ISW5 || ISW6 || ISW7 |

Message Type 3: Error Report and Penalty Count Message

| MT | NID | Message Count | Reserved (16) ||
|----|-----|---------------|-------|--------|
| Error Vector 0 ||| IPC 0 | BPC 0 |
| Error Vector 1 ||| IPC 1 | BPC 1 |
| Error Vector 2 ||| IPC 2 | BPC 2 |
| Error Vector 3 ||| IPC 3 | BPC 3 |
| Error Vector 4 ||| IPC 4 | BPC 4 |
| Error Vector 5 ||| IPC 5 | BPC 5 |
| Error Vector 6 ||| IPC 6 | BPC 6 |
| Error Vector 7 ||| IPC 7 | BPC 7 |
| AP/BIT 0 | AP/BIT 1 || AP/BIT 2 | AP/BIT 3 |
| AP/BIT 4 | AP/BIT 5 || AP/BIT 6 | AP/BIT 7 |

FIG. 8

METHOD AND APPARATUS FOR MANAGING REDUNDANT COMPUTER-BASED SYSTEMS FOR FAULT TOLERANT COMPUTING

RELATED APPLICATION

This invention claims priority to Provisional Application, Ser. No. 60/087,733 filed on Jun. 2, 1998, which is incorporated by reference herein.

BACKGROUND OF THE INVENTION

1. Field of the Invention

The present invention relates to computing environments, more particularly, it relates to a method for managing redundant computer-based systems for fault-tolerant computing.

2. Background of the Invention

Fault tolerant computing assures correct computing results in the existence of faults and errors in a system. The use of redundancy is the primary method for fault tolerance. There are many different ways of managing redundancy in hardware, software, information and time. Due to various algorithms and implementation approaches, most current systems use proprietary design for redundancy management, and these designs are usually interwoven with application software and hardware. The interweaving of the application with the redundancy management creates a more complex system with significantly decreased flexibility.

SUMMARY OF THE INVENTION

It is therefore an object of the present invention to provide a method for managing a redundant computer-based systems that is not interwoven with the application, and provides additional flexibility in the distributed computing environment.

According to an embodiment of the present invention, the redundant computing system is constructed by using multiple hardware computing nodes and installing a redundancy management system (RMS) in each individual node in a distributed environment.

The RMS is a redundancy management methodology implemented through a set of algorithms, data structures, operation processes and design applied through processing units in each computing system. The RMS has wide application in many areas that require high systems dependability such as aerospace, critical control systems, telecommunications, computer networks, etc.

To implement the RMS, it is separated, physically or logically, from the application development. This reduces the overall design complexity of the system at hand. As such, the system developer can design applications independently and can rely on the RMS to provide redundancy management functions. The RMS and application integration is accomplished by a programmable bus interface protocol which connects the RMS to application processors.

The RMS includes a Cross Channel Data Link (CCDL) module and a Fault Tolerant Executive (FTE) module. The CCDL module provides data communication between all nodes while the FTE module performs system functions such as synchronization, voting, fault and error detection, isolation and recovery. System fault tolerance is achieved by detecting and masking erroneous data through voting, and system integrity is ensured by a dynamically reconfigurable architecture that is capable of excluding faulty nodes from the system and re-admitting healthy nodes back into the system.

The RMS can be implemented in hardware, software, or a combination of both (i.e., hybrid) and works with a distributed system which has redundant computing resources to handle component failures. The distributed system can have two to eight nodes depending upon system reliability and fault tolerance requirements. A node consists of a RMS and an application processor(s). Nodes are interconnected together through the RMS's CCDL module to form a redundant system. Since individual applications within a node do not have full knowledge of other node's activities, the RMSs provide system synchronization, maintain data consistency, and form a system-wide consensus of faults and errors occurring in various locations in the system.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 8 is a diagram of the cross channel data link message structure according to an embodiment of the invention;

DETAILED DESCRIPTION OF PREFERRED EMBODIMENTS

According to an embodiment of the present invention, the redundancy management system (RMS) provides the following redundancy management functions: 1) Cross-channel data communication; 2) Frame-based system synchronization; 3) Data Voting; 4) Fault and error detection, isolation and recovery; and 5) a graceful degradation and self healing.

The cross-node data communication function is provided by the CCDL module. The CCDL module has one transmitter and up to eight parallel receivers. It takes data from its local node and broadcasts data to all nodes including its own. Communication data is packaged into certain message formats and parity bits are used to detect transmission errors. All CCDL receivers use electrical-to-optical conversion in order to preserve electrical isolation among nodes. Therefore, no single receiver failure can over drain current from other node's receivers resulting in a common mode failure across the system.

The RMS is a frame-based synchronization system. Each RMS has its own clock and system synchronization is achieved by exchanging its local time with all nodes and adjusting the local clock according to the voted clock. A distributed agreement algorithm is used to establish a global clock from failure by any type of faults, including Byzantine faults.

The RMS employs data voting as the primary mechanism for fault detection, isolation and recovery. If a channel generates data which is different from a voted majority, the voted data will be used as the output to mask the fault. The faulty node will be identified and penalized by a global penalty system. Data voting includes both application data and system status data. The RMS supports heterogeneous computing systems in which fault-free nodes are not guaranteed to produce the exact same data (including data images) due to diversified hardware and software. A user specified tolerance range defines erroneous behavior should a data deviation occur in the voting process.

The RMS supports a graceful degradation by excluding a failed node from a group of synchronized, fault-free nodes defining the operating set. A penalty system is designed to penalize erroneous behavior committed by any faulty node. When a faulty node exceeds its penalty threshold, other fault-free nodes reconfigure themselves into a new operating set that excludes the newly identified faulty node. The excluded node is not allowed to participate in data voting and its data is used only for monitoring purposes. The RMS also has the capability, through dynamic reconfiguration, to re-admit a healthy node into the operating set. This self-healing feature allows the RMS to preserve system resources for an extended mission.

Figure 1:
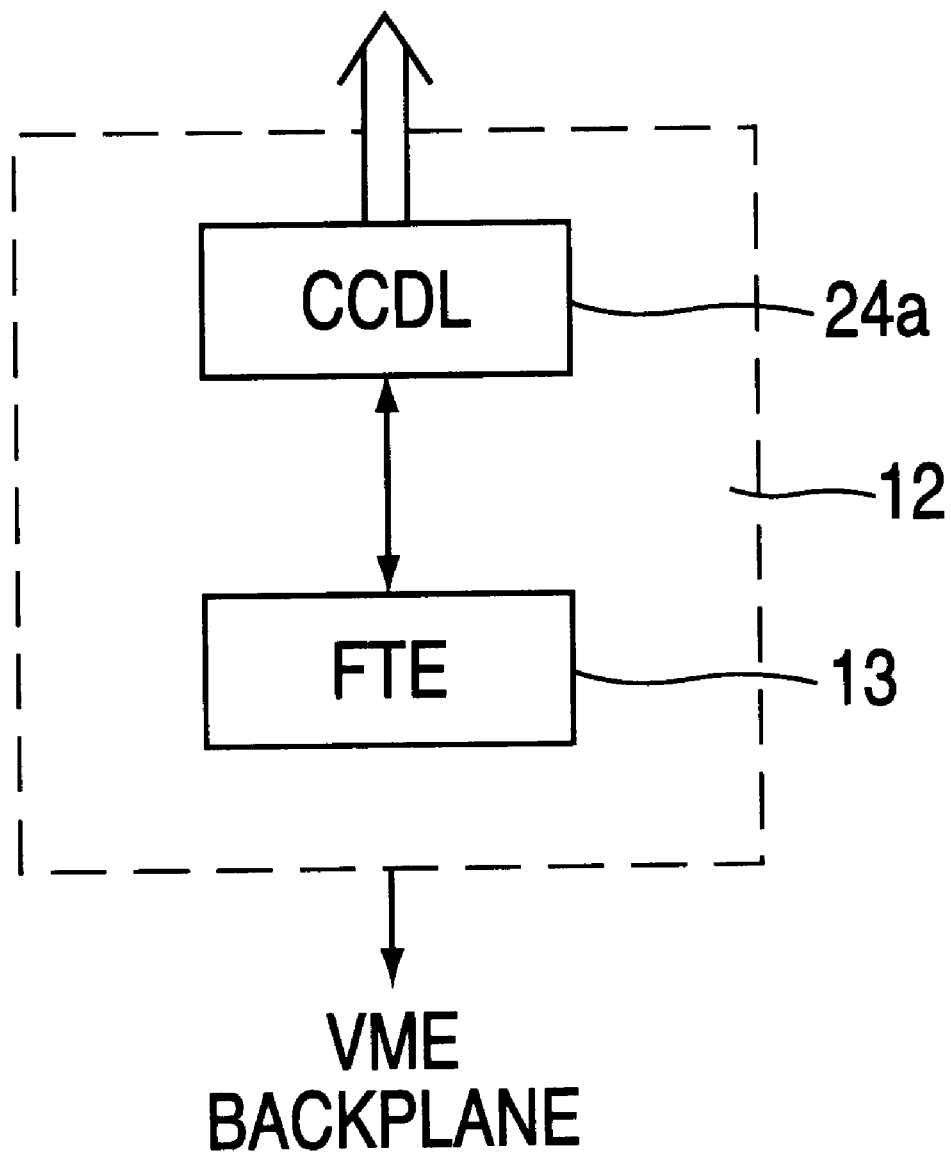
FIG. 1 is a block diagram of the redundancy management system according to an embodiment of the present invention.

FIG. 1 shows a top-level block diagram of the RMS system according to an embodiment of the present invention. The RMS 12 includes a cross channel data link (CCDL) module 24a, and a fault tolerator executive module 13. The FTE 13 is resident on a VME card or other single board computer, and is connected to other cards in a system via the VME backplane bus or other suitable data bus. The RMS 12 is connected to other RMS's resident on each card via the CCDL module 24a. Each RMS includes its own CCDL module for establishing a communication link between the respective RMS's. The establishment of a communication link via the CCDL's provides additional flexibility in monitoring the integrity of all cards in a system. By implementing an RMS on each computing node, and connecting the same to each other, system faults can be detected, isolated, and dealt with more efficiently than other fault tolerant systems.

SYSTEM ARCHITECTURE

Figure 2:
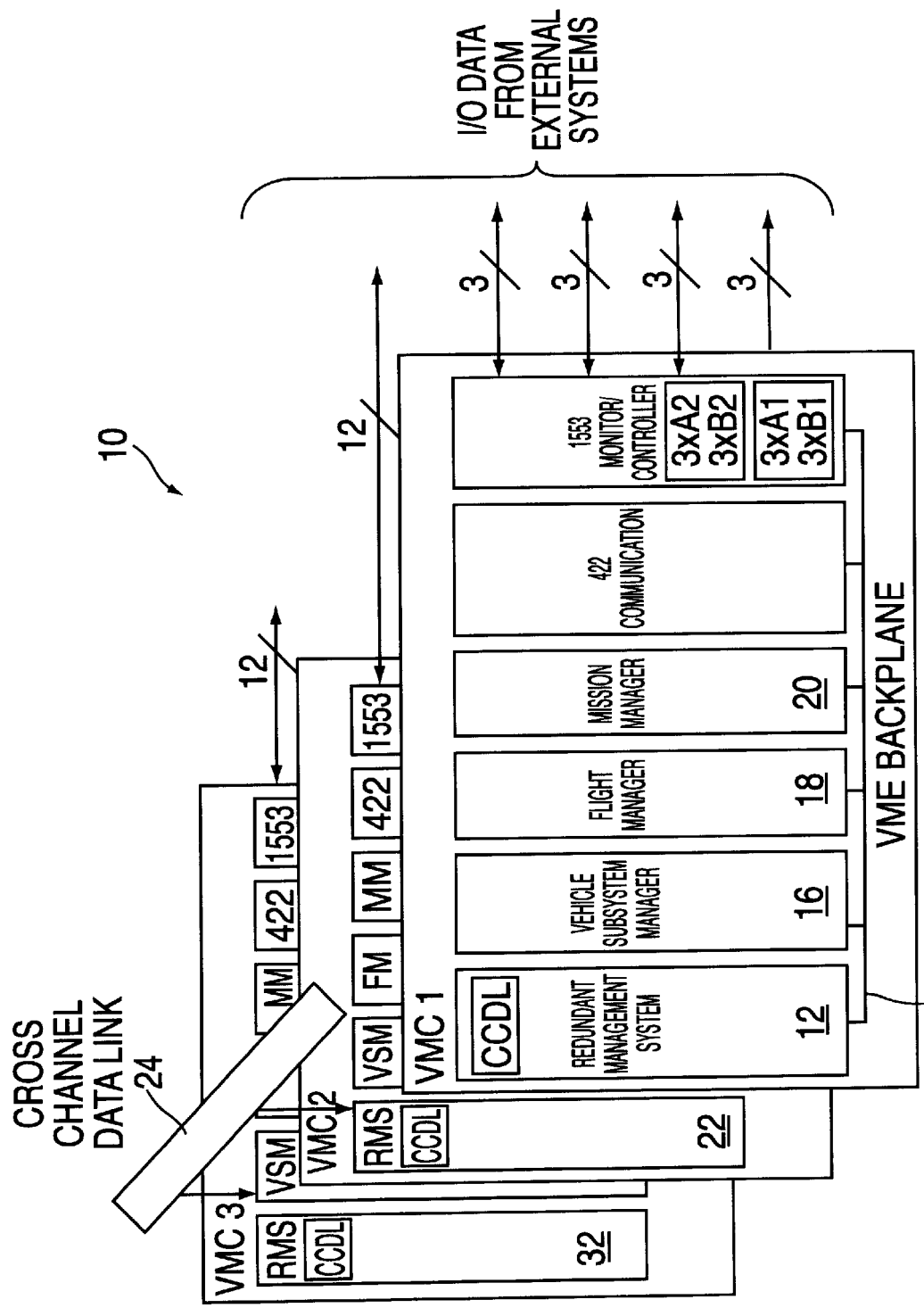
FIG. 2 is a block diagram of a three-node RMS based fault tolerant system according to an exemplary embodiment of the present invention.

An exemplary three-node RMS-base system architecture 10 according to an embodiment of the present invention is depicted in FIG. 2. In this architecture, the RMS interconnects three Vehicle Mission Computers (VMC) to form a redundant, fault tolerant system. Each VMC has a VME chassis with several single-board computers in it. The RMS 12 is installed in the first slot of VMC 1, and the communication between RMS and other application boards is through the VME backplane bus 14. Each VMC takes inputs from its external 1553 buses. The three main applications, Vehicle Subsystem Manager 16, Flight Manager 18 and Mission Manager 20, compute their functions and then store critical data in VME global memory (see FIG. 7) for voting.

Each RMS 12, 22 and 32, of the respective boards VMC1, VMC2 and VMC3, takes data via the VME bus and broadcasts the local data to other nodes through the cross channel data link (CCDL) 24. After receiving three copies of data, the RMS will vote and write the voted data back to the VME global memory for use by the applications.

SYSTEM FAULT TOLERANCE

Each node in the RMS is defined as a fault containment region (FCR) for fault detection, isolation, and recovery. Conventionally, an FCR usually has a territory bounded by natural hardware/software components. The key property of the FCR is its capability to prevent fault and error propagation into another region. Multiple faults occurring in the same region are viewed as a single fault because other regions can detect and correct the fault through the voting process. The number of simultaneous faults a system can tolerate depends upon the number of fault-free channels available in the system. For non-Byzantine faults, N 2f+1 where N is the number of fault-free channels and f is the number of faults. If a system is required to be Byzantine safe, N $3f_B+1$ where $f_B$ is the number of Byzantine faults.

The RMS can tolerate faults with different time durations such as transient faults, intermittent faults and permanent faults. A transient fault has a very short duration and occurs and disappears randomly. An intermittent fault occurs and disappears periodically with a certain frequency. A permanent fault remains in existence indefinitely if no corrective action is taken. In conventional fault tolerant systems design, rigourous pruning of faulty components can shorten fault latency, and thus, enhance the system's integrity. Nevertheless, immediate exclusion of transiently faulty components may decrease systems resources too quickly, and jeopardize mission success. The fault tolerance of the RMS allows a user to program its penalty system in order to balance these two conflicting demands according to application requirements. Different penalties can be assigned against different data and system errors. High penalty weights for certain faults will result in rapid exclusion of faulty channels when such faults occur. Low penalty weights against other faults will allow a faulty node to stay in the system for a predetermined time so that it can correct its fault through voting.

According to the RMS system of the present invention, fault containment in three node configuration excludes faulty nodes when penalties exceed the user-defined exclusion threshold. A node is re-admitted into the operating set when its good behavior credits reach the re-admission threshold. Conflicts in application or node data are resolved by mid-value selection voting.

In a two node configuration, the RMS cannot detect or exclude a faulty node. As such, voting cannot be used to resolve conflicts. The application must determine who is at fault and take appropriate action.

RMS IMPLEMENTATION

As previously mentioned, the RMS has two subsystems, Fault Tolerant Executive (FTE) and Cross-Channel Data Link (CCDL). The FTE consists of five modules (FIG. 5): 1) a Synchronizer 80; 2) a Voter 58; 3) a Fault Tolerator (FLT) 84; 4) a Task Communicator (TSC) 46; and 5) Kernal (KRL) 52. The functions of these modules will be described in the foregoing.

SYSTEM SYNCHRONIZATION

The Synchronizer (SYN) 80 (FIG. 5) establishes and maintains node synchronization for the system. It is required that, at any time, each individual RMS must be in, or operate in one of five states: 1) POWER_OFF; 2) START_UP; 3) COLD_START; 4) WARM_START; and 5) STEADY_

Figure 3:
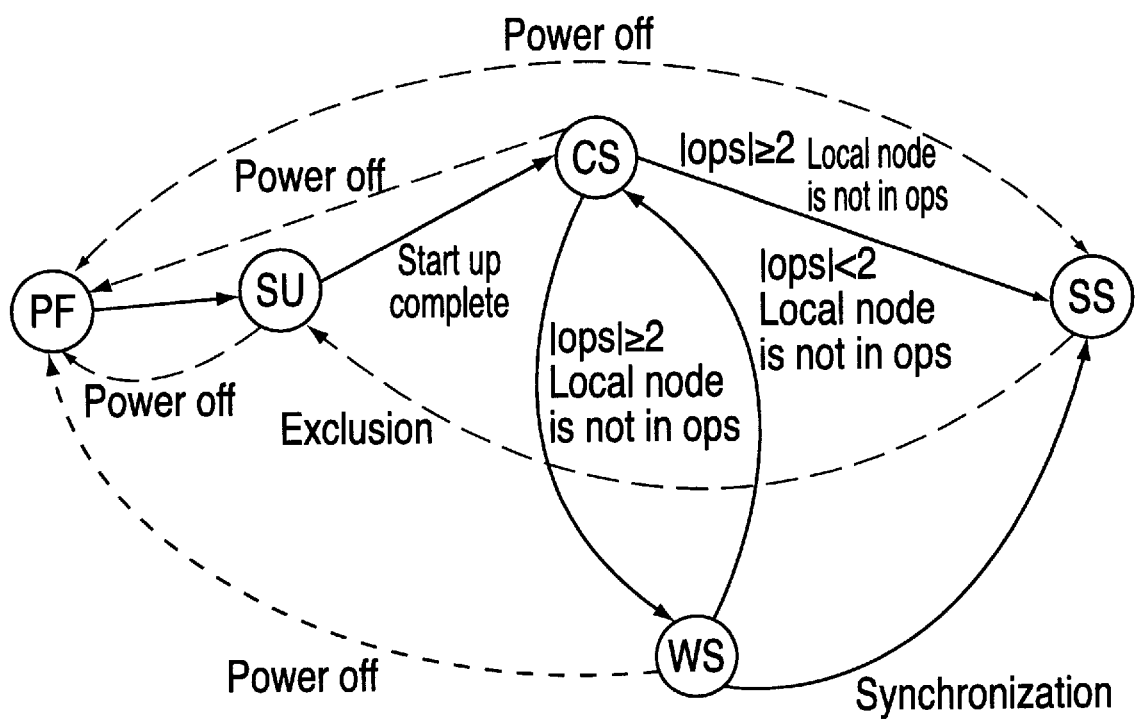
FIG. 3 is a state transition diagram of the redundancy management system according to an embodiment of the invention.

STATE. FIG. 3 shows a state transistion diagram of an individual RMS and its five states.

POWER_OFF (PF) is the state when the RMS is non-operational and the power source of the associated computer is off for any reason. When the RMS is powered-up, the RMS unconditionally transitions to START-UP.

START_UP (SU) is the state after the computer has just been powered up and when all system parameters are being initialized, RMS timing mechanisms are being initialized and the inter-node communications links (i.e., CCDLs) are being established. When the start-up process is complete, the RMS unconditionally transitions to COLD_START.

COLD_START (CS) is the state in which the RMS cannot identify an existing Operating Set (OPS) and is trying to establish an OPS. The OPS is a group of nodes participating in normal system operation and voting. The RMS transitions from a WARM_START to COLD_START when less than two RMSs are in the OPS.

WARM_START (WS) is the state in which the RMS identifies the OPS containing at least 2 RMSs but the local RMS itself is not in the OPS.

STEADY_STATE (SS) is the state when the node of the RMS is synchronized with the OPS. A STEADY_STATE node can be in or out of the OPS. Each node in the OPS is performing its normal operation and voting. A node not included in the OPS is excluded from voting but its data is monitored by the OPS to determine its qualification for readmission.

In the Cold-Start, an Interactive Convergence Algorithm is used to synchronize node clocks into a converged clock group which is the operating set (OPS). All members are required to have a consistent view about their memberships in the OPS and they all switch to the Steady-State mode at the same time.

In the Steady-State mode, each node broadcasts its local time to all nodes through a System State (SS) message. Every node dynamically adjusts its local clock to the global clock in order to maintain system synchronization. Since RMS is a frame-syncronized system, it has a predetermined time window called the Soft-Error Window (SEW) that defines the maximum allowable synchronization skew. Each fault-free RMS should receive other SS messages in the time interval bounded by the SEW. Since RMS is used in a distributed environment, using a single SEW window has an inherent ambiguity in determining synchronization errors among participating nodes. See, P. Thambidurai, A. M. Finn, R. M. Kieckhafer, and C. J. Walter, "*Clock Synchronization in MAFT*" Proc. IEEE 19$^{th}$ International Symposium on Fault-Tolerant Computing, the entire content of which is incorporated herein by reference. To resolve the ambiguity, another time window known as a Hard-Error Window (HEW) is used. For example, if node "A" receives node "B's" clock outside of "A's" HEW, node "A" reports a synchronization error against nodes "B". However, if node "B" sees that its own clock (after receiving its own SS message) is in the HEW, node "B" reports that node A has a wrong error report regarding synchronization. The ambiguity of mutually accusing nodes needs to be resolved by other node's views about node "B's" clock. If node "A" is correct, other nodes should observe that node "B's" clock has arrived at least outside of their SEW. Sustained by other node's error reports, the system can then identify node "B" as the faulty node. Otherwise, node "A" is the faulty node because of its deviation from majority view in the error report.

Warm-Start (WS) is half way between Cold-Start and Steady-State. A node may be excluded from the OPS because of faults and errors. The excluded node can go through reset and try to re-synchronize with the operating set in the Warm-Start mode. Once the node detects that it has synchronized with the global clock of the operating set, it can switch to the Steady-State mode. Once in the Steady-State mode, the excluded node is monitored for later re-admission into the OPS.

Time Synchronization within a VMC utilizes location monitor interrupts generated by RMS, and the VSM Scheduler uses frame boundary and Mid-frame signals for scheduling tasks. Time Synchronization across the VMCs ensures source congruence. The CCDL time stamps RMS system data messages received over the 8 M bit data link. The FTE gets the RMS system data from the VMCs and votes the time of these received messages, and adjusts CCDL local time to the voted value. The FTE then generates an interrupt on the synchoronized frame boundary

SYSTEM VOTING

Figure 4:
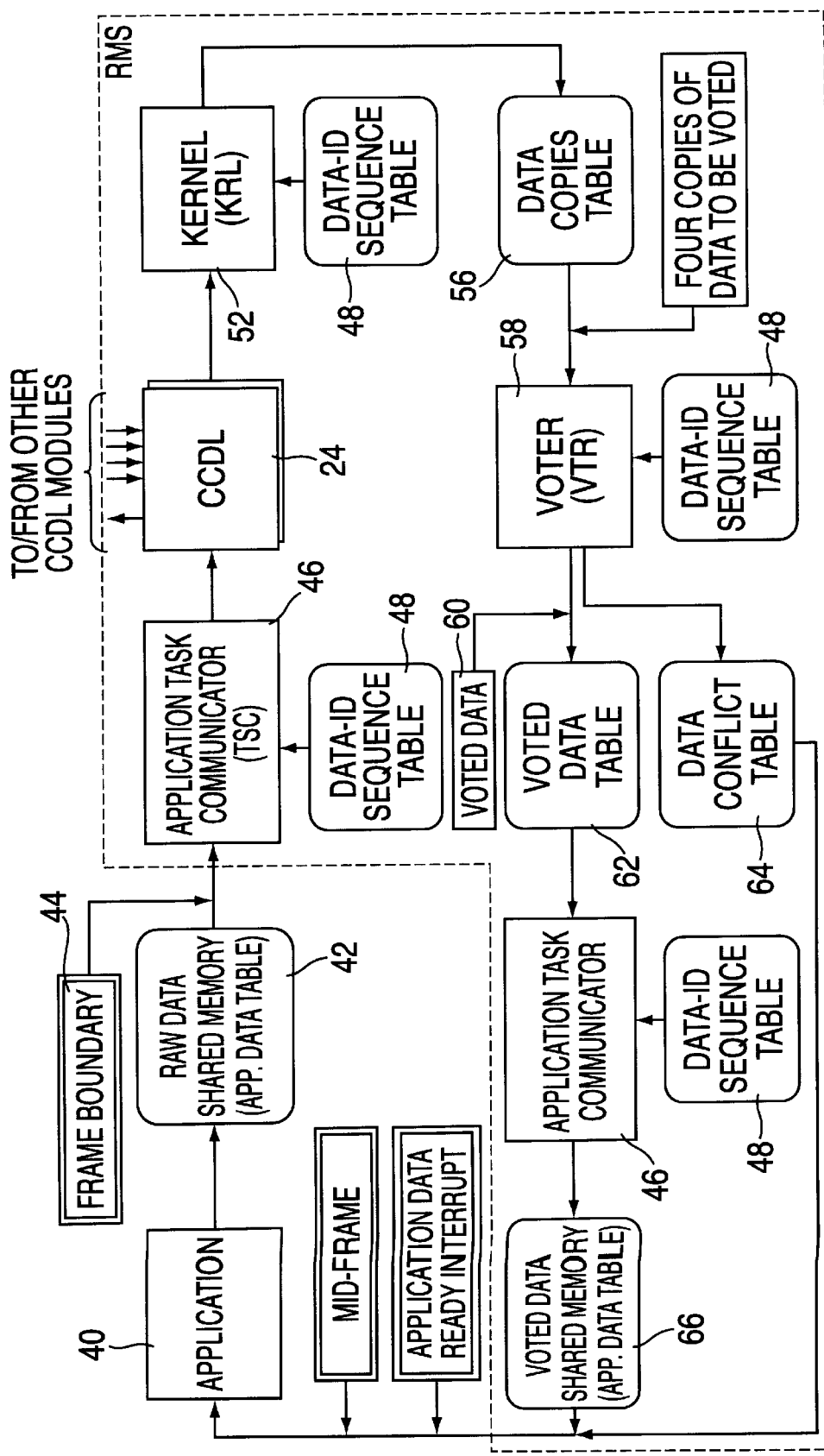
FIG. 4 is a block diagram of the redundancy management system, the application interaction and voting process according to an embodiment of the invention.

In RMS, voting is the primary technique used for fault detection, isolation, and recovery. The RMS Voter (VTR) in the FTE votes on system states, error reports and application data. The voting of system states establishes a consistent view about system operation such as the membership in the OPS and synchronization mode. The voting on error reports formulate a consensus about which node has erroneous behavior and what the penalty for these errors should be. The voting on application data provides correct data output for the application to use. The data voting sequence is shown in FIG. 4.

The RMS data voting is a cyclic operation driven by a minor frame boundary. A minor frame is the period of the most frequently invoked task in the system. As demonstrated in FIG. 4, a four node system generates application data 40 in a minor frame and stores the data in a raw data shared memory 42 known as the application data table for RMS to vote. At the minor frame boundary 44, the Task Communicator (TSC) module 46 of the RMS uses the Data-Id Sequence Table (DST) 48 as pointers to read the data from application data table 42. The DST 48 is a data voting schedule which determines which data needs to be voted in each minor frame, and it also contains other associated information necessary for voting. After reading the data, the TSC 46 packages the data into a certain format and sends the data to the CCDL 24. The CCDL broadcasts its local data to other nodes while receiving data from other nodes as well. When the data transfer is completed, the Kernal (KRL) 52 takes the data from the CCDL 24 and stores the data in the Data Copies Table 56 where four copies of data are now ready for voting (i.e., 3 copies from other RMSs and one from the present RMS). The voter (VTR) 58 performs voting and deviance checks. A median value selection algorithm is used for integer and real number voting and a majority voting algorithm is used for binary and discrete data voting. The data type and its associated deviation tolerance are also provided by the DST 48 which is used by the VTR 58 to choose a proper voting algorithm. The voted data 60 is stored in the Voted Data Table 62. At a proper time, the TSC module 46 reads the data from the voted table 62 and writes it back to the Application Data Table (or voted data shared memory) 66 as the voted outputs. Again, the addresses of the output data are provided by the DST 48. For each voted data, a data conflict flag may be set in the Data Conflict Table 64 by the VTR 58 if the system has only two operating nodes left and the VTR detects the existence of data disagreement. The Data Conflict Table 64 is located in a shared memory space so that the application software can access the table to determine if the voted data is valid or not.

TABLE 1

Data Voting Options

| Data Type | Description | Voting Algorithm | Voting Time Est. |
|---|---|---|---|
| Signed Integer | 32 Bit Integer | Mid-Value Selection | 6.0 secs |
| Float | IEEE single precision floating point | Mid-Value Selection | 5.3 secs |
| Unsigned Integer | 32 Bit word voted as a word (may be useful in voting status words) | Mid-Value Selection | 6.0 secs |
| 32 Bit Vector | 32 bit word of packed booleans. Voted as 32 individual booleans | Majority Vote | 12 secs |

Table 1 is an exemplary table of data voting options where the specified data types are IEEE standard data types for ANSI "C" language.

FAULT TOLERATOR

By defining the Fault Containment Region as each node, a FCR (i.e., channel) can manifest its errors only through message exchanges to other FCR's (channels). See, J. Zhou, "Design Capture for System Dependability", Proc. Complex Systems Engineering Synthesis and Assessment Workshop, NSWC, Silver Spring, MD, July, 1992, pp 107–119, incorporated herein by reference. Through voting and other error detection mechanisms, the fault tolerator (FLT) 84 (FIG. 5) summarizes errors into the 15 types shown in table 2. A 16 bit error vector is employed to log and report detected errors. The error vector is packaged in an error report message and broadcast to other nodes for consensus and recovery action at every minor frame.

TABLE 2

(Error Vector Table)

| Error ID | Error Description | Detected By | Penalty Weight |
|---|---|---|---|
| E1 | (Reserved) | | |
| E2 | A message is received with an invalid message type, node ID or data ID | CCDL | 1 or TBD |
| E3 | Horizontal or vertical parity error, incorrect message length, or message limit exceeded | CCDL | 1 or TBD |
| E4 | Too many Error Report or System State messages are received | CCDL | 2 or TBD |
| E5 | A non-SS message received within Hard-Error-Window | KRL | 4 or TBD |
| E6 | More than one of the same data has been received from a node | KRL | 2 or TBD |
| E7 | Missing SS message, or PRESYNC/SYNC messages do not arrive in the right order | SYN | 2 or TBD |
| E8 | An SS message does not arrive within the Hard-Error-Window (HEW) | SYN | 4 or TBD |
| E9 | An SS message does not arrive within the Soft-Error-Window (SEW) | SYN | 2 or TBD |
| E10 | An SS message was received with a minor and/or major frame number different from the local node | SYN | 4 or TBD |
| E11 | The CSS and/or NSS of the node do not agree with the Voted CSS and/or NSS | VTR | 4 or TBD |
| E12 | An error message has not been received from a node in this minor frame | VTR | 2 or TBD |
| E13 | Missing data message | VTR | 2 or TBD |
| E14 | The data value generated by a node is inconsistent with the voted value | VTR | 2 or TBD |
| E15 | The information contained in the error message from a node does not agree with that of the voted value | VTR | 3 or TBD |
| E16 | The number of errors accumulated for a node in one major fram has exceeded a preset limit | FLT | 4 or TBD |

Figure 6:
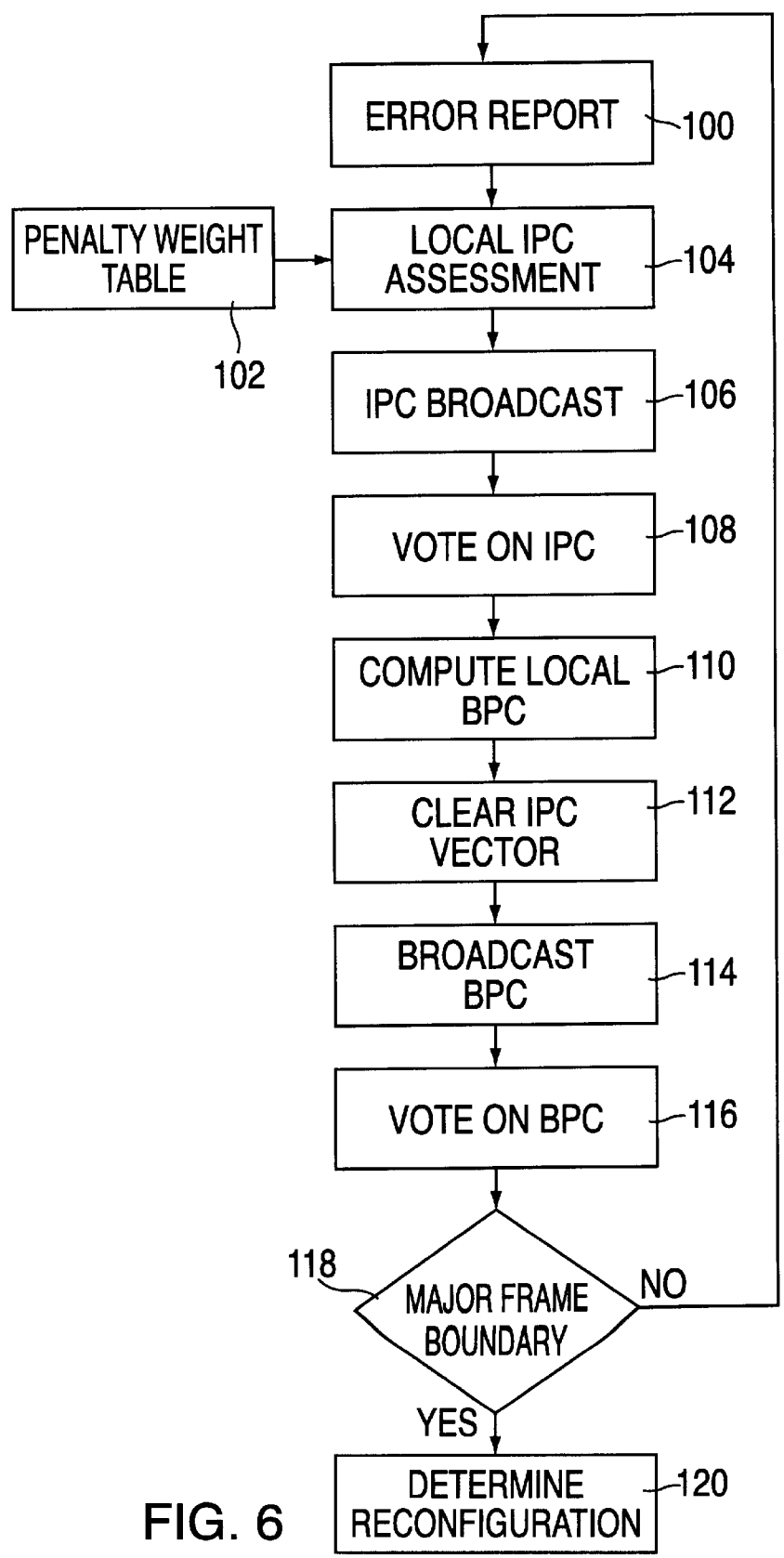
FIG. 6 is a block diagram of the voting and penalty assignment process performed by the fault tolerator according to an embodiment of the invention.

LEGEND:
CSS: Current System State indicated the nodes in the OPS in the current minor frame
NSS: Next System State indicated the nodes in the OPS in the next minor frame
OPS: Operating Set which is defined as the set of fault-free system nodes in Steady-State mode
TBD: To be Determined
CCDL: Cross Channel Data Link
KRL: Kernal
SYN: Synchronizer
VTR: Voter
FLT: Fault Tolerator Referring to FIG. 6, the FLT 84 assesses a penalty 104 against a node which is the source of errors. At every minor frame, all detected (reported) errors 100 are assigned with penalties using a penalty weight table 102, and the penalty sum is stored in a Incremental Penalty Count (IPC). The local IPC is assessed (104), and broadcast (106) to the other nodes via the CCDL. The FLT module votes on the IPC (108) and the voted result is stored in a Base Penalty Count (BPC) 110. The IPC captures errors for a particular minor frame and the BPC captures cummulative errors for entire mission time. After computing/storing the BPC (110), the IPC vector is cleared (112), and the BPC is broadcast (114) to th e other nodes via the CCDL. The BPC is also voted (116) every minor frame and the FLT uses the voted BPC to determine whether a penalty assignment and voting is required in order to ensure a consistent action among all fault-free nodes for system reconfiguration. Once the voting on the BPC (116) is complete, the FLT determines whether a major frame boundary has been reached (118). If yes, the reconfiguration is determined (120). If the major frame boundary is not reached, the process returns to the error report 100, and continues from the beginning.

The system reconfiguration includes both faulty node exclusion and healthy node re-admission. If the Base Penalty Count (BPC) of a faulty node exceeds a predetermined threshold, the RMS starts the system reconfiguration. During the reconfiguration, the system regroups the operating set to exclude the faulty node. Once a node loses its membership in the operating set, its data and system status will no longer be used in the voting process. The excluded node needs to go through a reset process. If the reset process is succesful, the node can try to re-synchronize itself with the operating set and it can switch to the Steady-State mode if the synchronization is successful. An excluded node can operate in the Steady-State mode, but is still outside of the operating set. The node now receives all system messages and application data from the nodes in the operating set.

All members in the operating set also receive messages from the excluded node and monitor its behavior. The BPC of the excluded node may be increased or decreased depending upon the behavior of the node. If the excluded node maintains fault-free operation, its BPC will be gradually decreased to below a predetermined threshold, and at the next major frame boundary, the system goes through another reconfiguration to re-admit the node.

RMS AND APPLICATION INTERFACE

The current RMS implementation uses the VME bus and shared memory as the RMS and application interface. However, this is only one possible implementation and other communication protocol can also be employed to implement the interface. The main function of the TSC module 46 (FIG. 4) is to take data from designated communication media and package data into a certain format for the RMS to use. When a voting cycle is complete, the TSC takes the voted data and sends the data back to application.

RMS KERNEL

Figure 5:
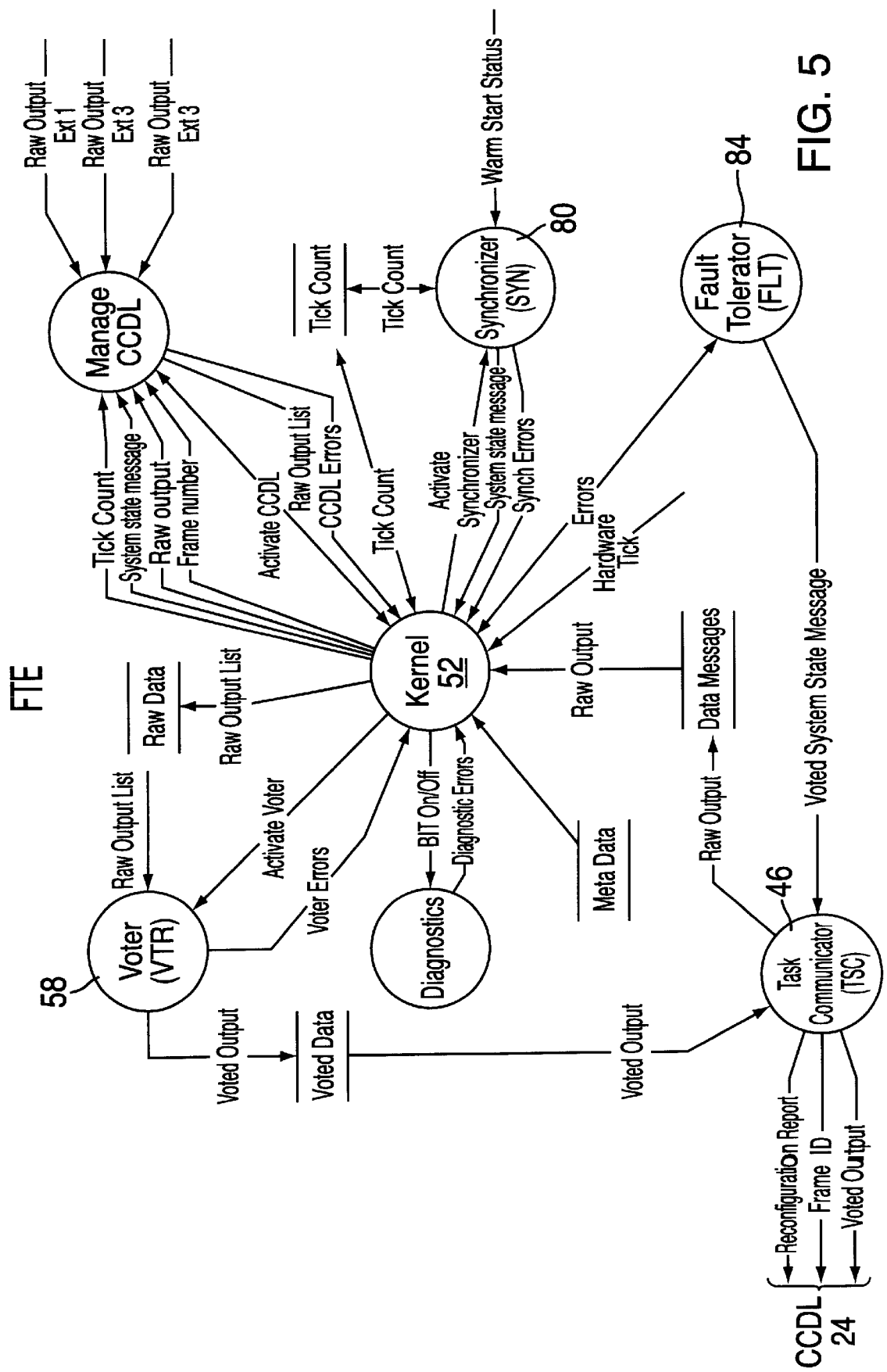
FIG. 5 is a schematic diagram of the context of the fault tolerant executive according to an embodiment of the present invention.

FIG. 5 shows a schematic diagram of the context of the fault tolerance executive (FTE) according to an embodiment of the invention. As shown, the Kernal 52 provides all of the supervisory operations for the RMS. The Kernal 52 manages the startup of RMS, calling the appropriate functions to initialize the target processor as well as the loading of all initial data. During the startup process, the Kernal configures the CCDL module by loading the system configuration data and the proper operational parameters. The Kernal manages the transitions between the RMS operating nodes (i.e., Cold-Start, Warm-Start, and Steady- State) by monitoring the status of other RMS modules and taking the appropriate actions at the correct times. The Kernal uses a deterministic scheduling algorithm such that all 'actions' are controlled by a self-contained time base. At a given 'tick' in the time-base cycle, the predetermined actions for that tick are always executed. The Kernal 52 coordinates FTE functions based on the time tick. RMS activities, such as fault detection, isolation and recovery, are scheduled by the Kernal at the appropriate times in the RMS minor frame. If a RMS node becomes faulty, the Kernal has the responsibility for restarting the node at the proper time. All data transfers between the RMS subsystems and beteween RMS and the application computer(s) are managed and scheduled by the Kernal. The Kernal directs the other modules to prepare various RMS messages and loads those messages into the CCDL for transmission at the Kernal's request. As messages are received by the CCDL, the Kernal extracts those messages and dispatches them to the correct module(s) for processing. The Kernal runs in a loop, continuously executing each of the scheduled actions and monitoring the RMS status.

The Fault Tolerant Executive (FTE) provides Byzantine fault resilience for 4 or more nodes. Byzantine safe is provided for 3 nodes under the condition of source congruency. The FTE votes application data, removes/reinstates applications for FTE, and synchronizes application and FTEs to <100 sec skew.

In an exemplary embodiment, the FTE takes approximately 4.08 msec (40% utilization) to vote 150 words and perform operating system functions. The FTE memory is 0.4 M bytes of Flash (5% utilization) and 0.6 M bytes of SRAM (5% utilization). These values have been provided for exemplary purposes. It is to be understood that one of ordinary skill in the art can alter these values without departing from the scope of the present invention.

RMS CONTEXT

Figure 7:
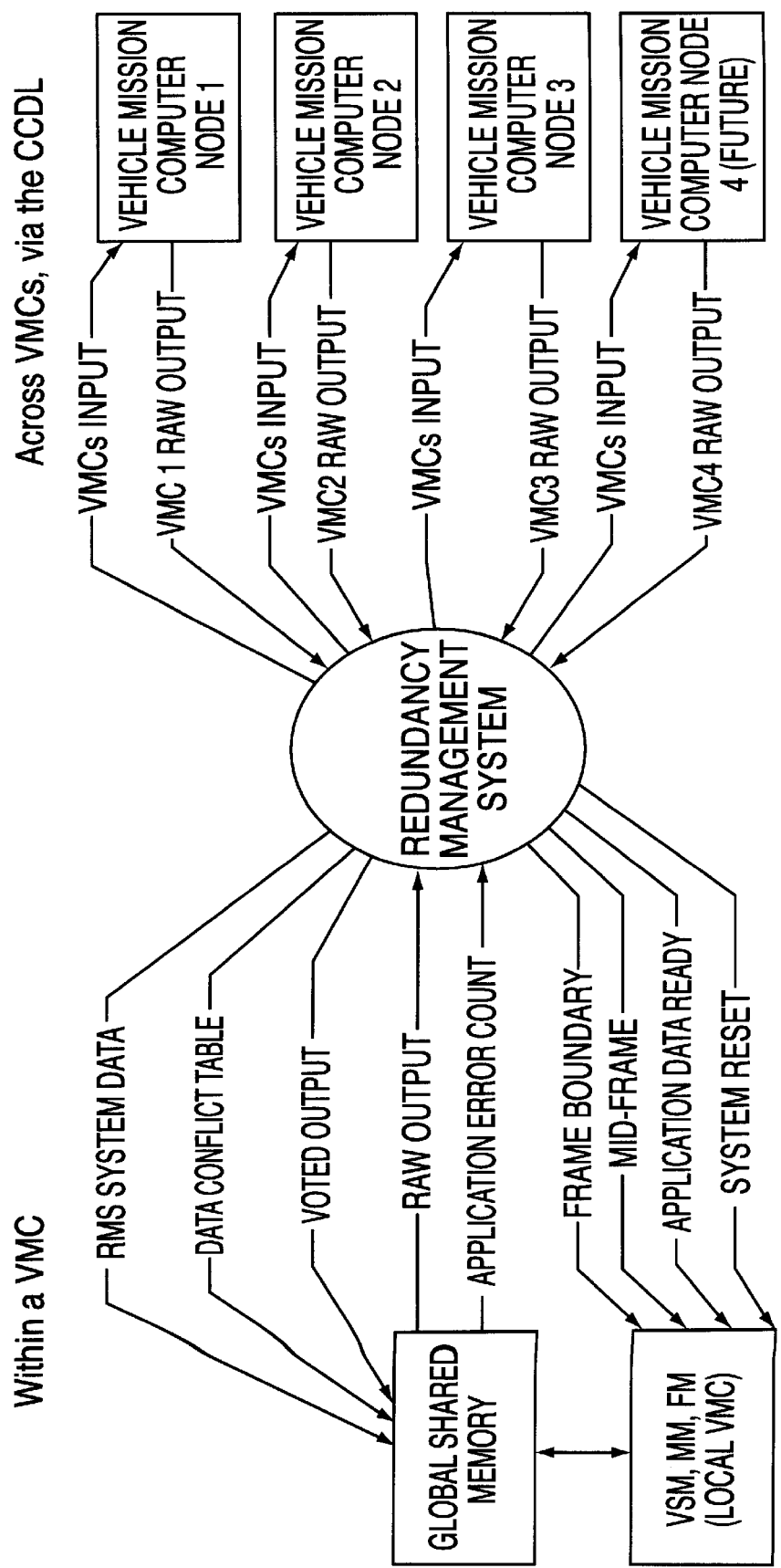
FIG. 7 is a schematic diagram of the context of the redundancy management system according to an embodiment of the invention.

FIG. 7 shows the RMS context or exchange structure between the RMS and VMC in the operating environment. The information being transferred within the VMC includes the RMS System Data which is delivered at the RMS Frame Boundary, and includes information such as the minor frame number, the voted current/next system state for indicating who is operating in and out of the operating set, and a system conflict flag for use in a two node configuration. The Data Conflict Table is used in a two node configuration for indicating an unresolvable data conflict on a peer data element basis. The Voted Output is the voted value for each data element submitted for voting from an operating set member. The RMS System Data, Data Conflict Table and Voted Output are transferred by the RMS to the Global shared memory that is in communication with the local VMC in which the RMS is operating.

The Raw Output is data submitted to the RMS for voting by all nodes in Steady State mode. The Application Error Count is an optional capability of the system, and is transferred to the RMS for enabling an application to affect the error penalty assessed by the RMS in determining the operating set.

The Frame boundary information includes an interrupt to signal the beginning of a RMS frame. This signal frame synchronizes the FM, VSM, and MM. The Mid-Frame information is another interrupt which provides a signal 5 msecs from the beginning of the frame. The Application Data Ready information includes an interrupt generated by the RMS to signal the applications that voted data is waiting and can be retrieved and processed. The System Reset is an optional control that the application can use on reset.

CROSS CHANNEL DATA LINE (CCDL)

The CCDL module provides data communication among nodes. The data is packaged into messages and the message structure is shown in FIG. 8. As shown, the message structure includes a header, and various message types according to the types of messages being transmitted and received. Message type 0 is the structure of a data message; type 1 is the structure for a system state message; type 2 is the structure of a cold start message; and type 3 is the structure of an error report and penalty count message.

Figure 9:
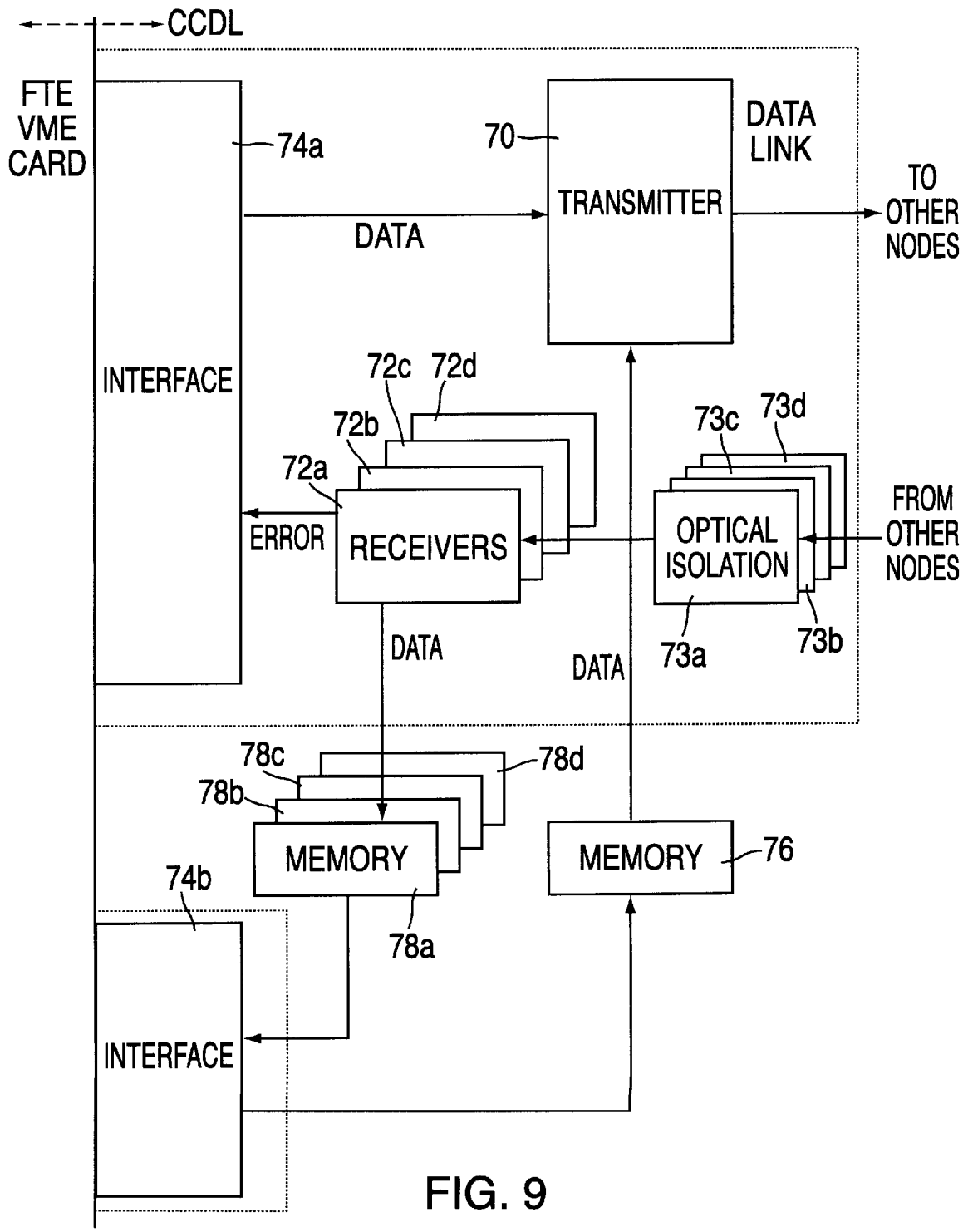
FIG. 9 is a block diagram of the cross channel data link top level architecture according to an embodiment of the invention.
Figure 10:
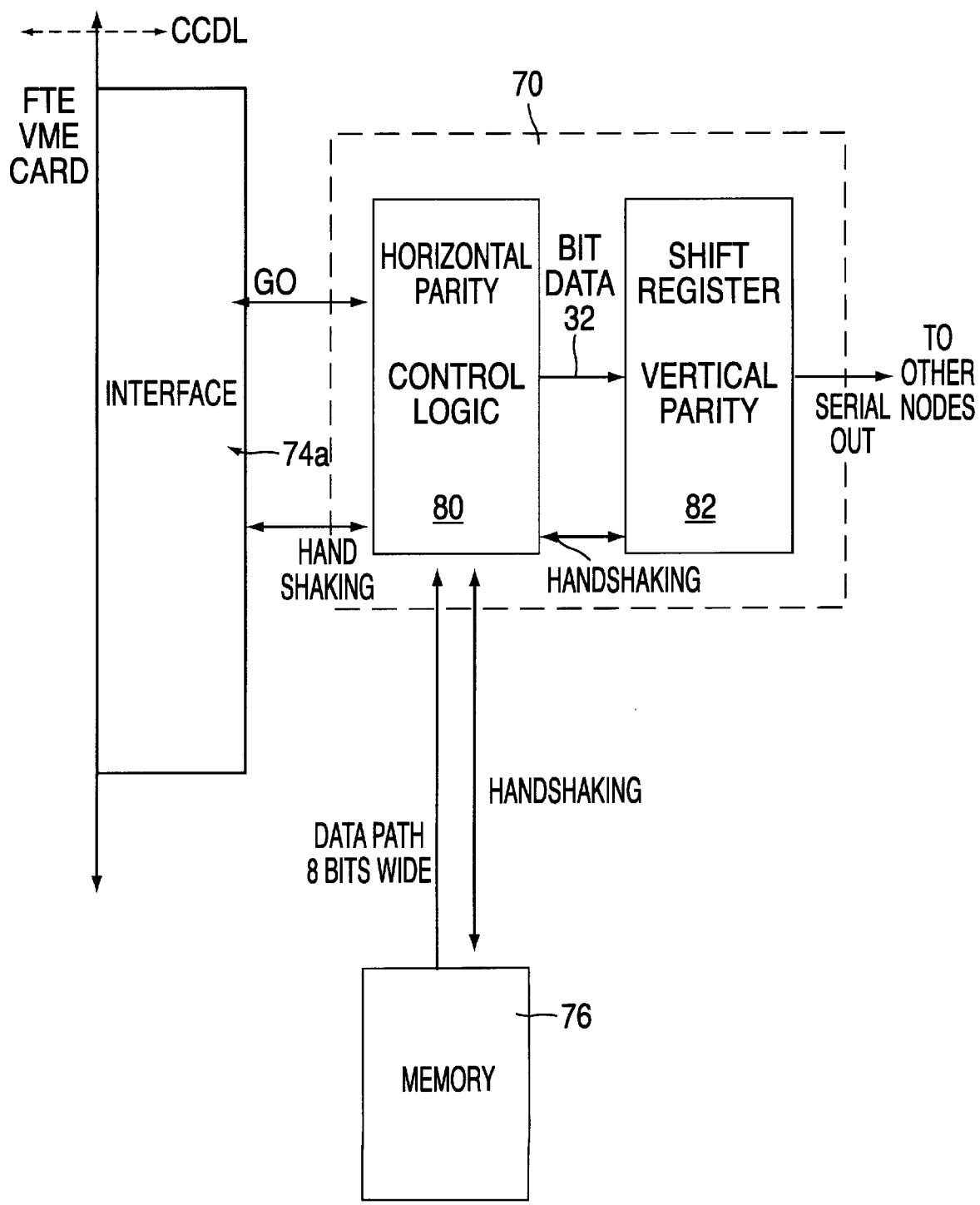
FIG. 10 is a block diagram of the cross channel data link transmitter according to an embodiment of the invention.
Figure 11:
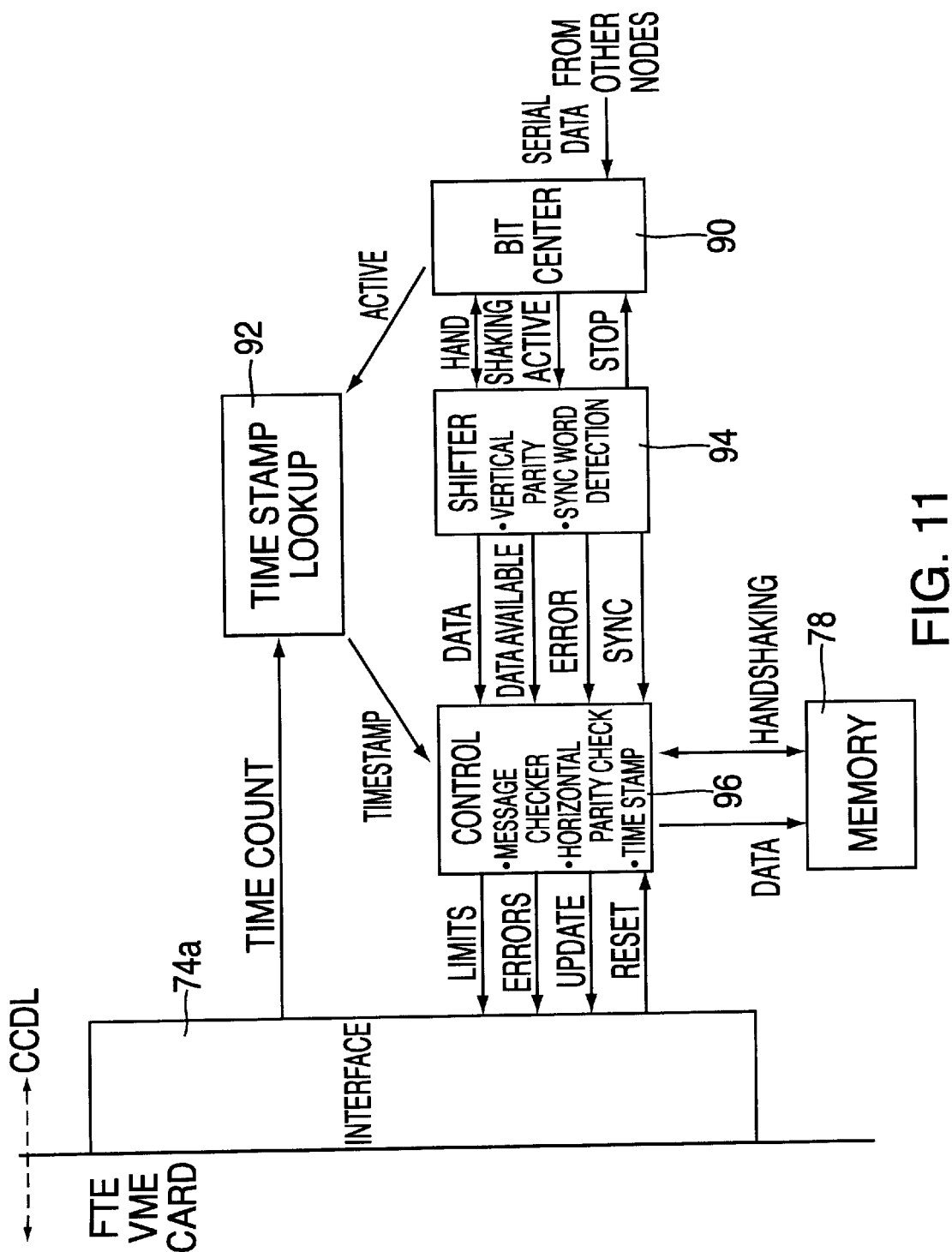
FIG. 11 is a block diagram of the cross channel data link receiver according to an embodiment of the invention.

Each CCDL has a transmitter and up to eight receivers. The CCDL top level architecture, transmitter and receiver schematics are depicted in FIGS. 9–11. FIG. 9 shows a top level CCDL architecture with one transmitter 70, four receivers 72a–72d, and two interfaces 74a and 74b using a DY4 MaxPac mezzanine protocol. One interface 74b facilitates data exchange between the base VME card and the CCDL memory, and the other interface 74a handles control logic and error reporting. When data needs to be transmitted, the CCDL interface 74b takes data from the base card and stores it into the 8 bit transmitter memory 76. When data is received, the four receivers 72a–d process and store the received data in the four receiver memories 78a–d, respectively, one for each node. The FTE then takes the data under the control of the CCDL. Since the CCDL is the only module which establishes physical connection among nodes, it must enforce electrical isolation in order to guarantee Fault Containment Region for the system. The present CCDL uses the electrical-to-optical conversion to convert electrical signals to optical signals. Each receiver 72a–72d has a corresponding optical isolator 73a–73d to provide the necessary isolation function. This enables every node to have its own power supply, and all of them are electrically isolated from each other.

FIG. 10 shows a more detailed view of the transmitter 70 architecture in accordance with an embodiment of the present invention. When a "GO" command is issued by the FTE, the transmitter control logic 80 reads data from its 8 bit memory 76, forms the data into a 32 bit format, and appends a horizontal word to the end of the data. The shift register circuit 82 converts the data into a serial bit string with vertical parity bits inserted into the string for transmission.

FIG. 11 illustrates how the serial data string is received from a transmitting node and stored in its corresponding memory. The Bit Center logic 90 uses system clock (e.g., 48 MHZ) cycles to reliably log in one data bit. When the first bit of a data string is received, the Time Stamp logic 92 records the time for synchronization purposes. The shifter circuit 94 strips vertical parity bits and converts serial data into 8 bit format. An error will be reported should the vertical bit show transmission errors. The control logic 96 further strips horizontal parity from the data and stores it into the receiver memory (e.g., 78a) according to the node number information attached with the data.

Both horizontal and vertical parity bits are attached to data messages in order to enhance communication reliability. Message format is verified by the CCDL and only valid messages are sent to the Kernal for further processing.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed:

1. A method for managing redundancy computer based systems having multiple hardware computing nodes comprising the steps of:
   providing a corresponding redundancy management system (RMS) to each computing node:
   establishing a communication link between each RMS:
   implementing a fault tolerant executive (FTE) module in each RMS for managing faults and a plurality of system functions;
   defining each computing node as a fault containment region;
   detecting faults/errors in data generated in a computing node, said detecting comprising the step of voting on data generated by each node to determine whether data generated by one node is different from a voted majority; and
   isolating a detected fault within the fault containment region to prevent propagation into another computing node, said isolating comprising using the step of voting on data as an output to mask a fault when data generated by a particular node is different from the voted majority.

2. A method for managing redundancy computer-based systems having multiple hardware computing nodes comprising the steps of:
   providing a corresponding redundancy management system (RMS) to each computing node;
   establishing a communication link between each RMS;
   implementing a fault tolerant executive (FTE) module in each RMS for managing faults and a plurality of system functions;
   detecting faults/errors in data generated in a node and preventing propagation of a detected fault/error in data generated in a node; said steps of detecting and preventing comprising the steps of
   voting on data generated by each node to determine whether data generated by one node is different from a majority; and
   using the voted data as an output to mask a fault when data generated by a particular node is different from the voted majority;
   identifying a faulty node in response to the result of data voting;
   penalizing the identified faulty node by a global penalty system; and
   excluding the identified faulty node from an operating set of nodes when the faulty node's penalties exceed a user specified fault tolerance range.

3. The method as claimed in claim 2, further comprising the steps of:
   monitoring data on the excluded node to determine whether the excluded node qualifies for re-admission into an operating set; and
   re-admitting the excluded node into the operating set when the monitoring indicates acceptable performance of the node within a predetermined threshold.

4. The method as claimed in claim 3, wherein the predetermined threshold is defined by a system operator.

5. A method for fault tolerant computing in computing environments having a plurality of computing nodes, comprising the steps of:
   implementing a corresponding redundancy management system (RMS) for each computing node independent from applications;
   communicating between each RMS; and
   maintaining an operating step (OPS) of nodes for increasing fault tolerance of the computing environment, said set of maintaining being performed in a fault tolerant executive (FTE) resident in the RMS and further comprises the steps of:
   receiving data at each RMS from every node connecting in the computing environment;
   determining at each RMS whether data received from any one node contains faults;

excluding a node which generated data that is faulty with respect to other received data; and re-configuring the operating set to not include the faulty node; said step of determining further comprising the steps of:

setting a tolerance range for faulty data;

voting on all received data from each node; and identifying a node having faulty data that exceeds the set tolerance range.

6. A method for fault tolerant computing in computing environments having a plurality of computing nodes, comprising the steps of:

implementing a corresponding redundancy management system (RMS) for each computing node independent from applications;

communicating between each RMS;

maintaining an operating set (OPS) of nodes for increasing fault tolerance of the computing environment, said step of maintaining being performed in a fault tolerant executive (FTE) resident in the RMS and further comprising the steps of:

receiving data at each RMS from every node connected in the computing environment;

determining at each RMS whether data received from any one node contains faults; and reconfiguring the operating set to not include the faulty node;

monitoring data on the excluded node; and re-admitting the excluded node into the operating set when the monitored data indicates the correction of the faulty data on the excluded node.

7. The method as claimed in claim 5, wherein said step of voting is performed at every minor frame boundary in the data transmission.

8. A method for fault tolerant computing in computing environments having a plurality of computing nodes, comprising the steps of:

implementing a corresponding redundancy management system (RMS) for each computing node independent from applications;

communicating between each RMS; and maintaining an operating set (OPS) of nodes for increasing fault tolerance of the computing environments said step of maintaining being performed in a fault tolerant executive (FTE) resident in the RMS and comprising the steps of:

receiving data at each RMS from every node connected in the computing environment;

determining at each RMS whether data received from any one node contains faults;

excluding a node which generated data that is faulty with respect to other received data; and reconfiguring the operating set to not include the faulty node, said step of reconfiguring being performed at every major frame boundary in the data transmission.

9. An apparatus for managing redundancy computer-based systems having multiple hardware computing nodes comprising:

means for providing a corresponding redundancy management system (RMS) to each computing node;

means for establishing a communication link between each RMS comprising a cross channel data link connected to each redundancy management system in each computing node;

means for implementing a fault tolerant executive (FTE) module in each RMS for managing faults and a plurality of system functions;

means for detecting faults/errors in data generated in any one node, said detecting means comprising means for voting on data generated by each node for determining whether data generated by one node is different from a voted majority;, means for isolating a detected fault/error when the node from which the fault/error was generated, said isolating means comprising means for using the voted data to mask a fault generated by one node that is different from the voted majority;

means for penalizing an identified faulty node by a global penalty system; and means for excluding the identified faulty node from an operating set of nodes when the faulty node's penalties exceed a user specified fault tolerance range.

* * * * *

UNITED STATES PATENT AND TRADEMARK OFFICE
CERTIFICATE OF CORRECTION

PATENT NO. : 6,178,522

DATED : January 23, 2001

INVENTOR(S) : J.X. Zhou, et al.

It is certified that error appears in the above-identified patent and that said Letters Patent is hereby corrected as shown below:

Column 7, Table 1, the Voting Time Estimates 6.0 secs
    5.3 secs
    6.0 secs
    12. secs are corrected to:

6.0 μsecs
    5.3 μsecs
    6.0 μsecs
    12. μsecs

Signed and Sealed this

Fifteenth Day of May, 2001

*Attest:*

NICHOLAS P. GODICI

*Attesting Officer*      *Acting Director of the United States Patent and Trademark Office*